United States Patent
Na et al.

(10) Patent No.: US 8,253,912 B2
(45) Date of Patent: Aug. 28, 2012

(54) LIQUID CRYSTAL DISPLAY

(75) Inventors: Hye-Seok Na, Seoul (KR); Seung-Soo Baek, Seoul (KR); Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1001 days.

(21) Appl. No.: 12/243,681

(22) Filed: Oct. 1, 2008

(65) Prior Publication Data
US 2009/0174635 A1    Jul. 9, 2009

(30) Foreign Application Priority Data
Jan. 7, 2008    (KR) .......................... 10-2008-0001776

(51) Int. Cl.
G02F 1/1343    (2006.01)
G02F 1/1337    (2006.01)
(52) U.S. Cl. ...................................... 349/144; 349/129
(58) Field of Classification Search .................. 349/144, 349/129–130
See application file for complete search history.

(56) References Cited

U.S. PATENT DOCUMENTS

| | | | | |
|---|---|---|---|---|
| 7,333,171 B2 * | 2/2008 | Kim et al. | ...................... | 349/144 |
| 7,355,666 B2 * | 4/2008 | Song et al. | ...................... | 349/144 |
| 7,656,487 B2 * | 2/2010 | Kim et al. | ...................... | 349/129 |

* cited by examiner

*Primary Examiner* — James Dudek
(74) *Attorney, Agent, or Firm* — Cantor Colburn LLP

(57) ABSTRACT

A liquid crystal display ("LCD") includes a decoupling line extending in a first direction, first and second data lines extending in a second direction perpendicular to the first direction, a pixel electrode including a first sub-pixel electrode and a second sub-pixel electrode. The pixel electrode further includes a lower domain-dividing part formed thereon. The LCD further includes a common electrode disposed opposite the pixel electrode and including an upper domain-dividing part formed thereon, and a first decoupling electrode including a slanting part and a straight part. The slanting part extends from the decoupling line and overlaps a portion of one of the lower domain-dividing part and the upper domain-dividing part, and the straight part extends from the slanting part and is formed parallel to the first data line in an area of the pixel where the first sub-pixel electrode and the first data line are adjacent to each other.

16 Claims, 10 Drawing Sheets

LIQUID CRYSTAL DISPLAY

This application claims priority to Korean Patent Application No. 10-2008-0001776, filed on Jan. 7, 2008, and all the benefits accruing therefrom under 35 U.S.C. §119, the entire contents of which in its entirety are herein incorporated by reference.

BACKGROUND OF THE INVENTION

1. Field of the Invention

The present invention relates to a liquid crystal display and, more particularly, to a liquid crystal display having improved display quality.

2. Description of the Related Art

A liquid crystal display ("LCD") includes two substrates, such as a lower substrate and an upper substrate, on which field generation electrodes, such as a pixel electrode and a common electrode, respectively, are formed, and a liquid crystal molecule layer interposed between the two substrates. An electric field is generated in the liquid crystal molecule layer by applying voltages to the field generation electrodes, a polarization of an incident light is controlled based on an alignment of liquid crystal molecules of the liquid crystal molecule layer according to the electric field, and an image is thereby displayed on the LCD.

A vertical alignment mode is often utilized in the LCD. Specifically, in the vertical alignment mode, main directors of the liquid crystal molecules are arranged at right angles to the upper substrate and the lower substrate when no electric field is applied thereto. The vertical alignment mode LCD has a high contrast ratio and a wide reference viewing angle relative to LCDs which utilize other alignment modes. However, the vertical alignment mode LCD has a reduced side visibility in comparison to it's a front visibility thereof. To improve the side visibility of the LCD utilizing the vertical alignment mode, a method has been proposed wherein, one pixel is divided into a pair of sub-pixels, a switching element is formed for each sub-pixel, and a separate voltage is applied to each sub-pixel.

In an LCD in which the one pixel is divided into the pair of sub-pixels, however, coupling capacitances formed between respective sub-pixel electrodes and/or data lines cause an undesirable luminance difference, which lowers a display quality of the LCD. Accordingly, there is need for an LCD having reduced coupling capacitances while maintaining an acceptable aperture ratio, since as the aperture ratio of the LCD decreases, more power is required.

BRIEF SUMMARY OF THE INVENTION

Accordingly, exemplary embodiments of the present invention are herein provided to solve the above-mentioned problems occurring in the prior art, and an exemplary embodiment of the present invention provides a liquid crystal display ("LCD") having an improved display quality by reducing coupling capacitances within the LCD.

According to an exemplary embodiment of the present invention an LCD includes: a gate line and a decoupling line extending in a first direction; a first data line and a second data line each extending in a second direction perpendicular to the first direction; a pixel electrode including a first sub-pixel electrode which receives a first data voltage from the first data line and a second sub-pixel electrode which receives a second data voltage from the second data line. The pixel electrode further includes a lower domain-dividing part formed thereon. The LCD further includes: a common electrode disposed opposite to the pixel electrode and including an upper domain-dividing part formed thereon; and a first decoupling electrode including a slanting part and a straight part and being connected to the decoupling line. The slanting part extends from the decoupling line and overlaps at least a portion of one of the lower domain-dividing part and the upper domain-dividing part, and the straight part extends from the slanting part and is formed substantially parallel to the first data line in an area of the pixel electrode where the first sub-pixel electrode and the first data line are adjacent to each other.

In an alternative exemplary embodiment of the present invention, an LCD includes: a gate line and a decoupling line extending in a first direction; a first data line and a second data line each extending in a second direction perpendicular to the first direction; a pixel electrode including a first sub-pixel electrode which receives a first data voltage from the first data line and a second sub-pixel electrode which receives a second data voltage from the second data line; a common electrode disposed opposite the pixel electrode; a first decoupling electrode extending from the decoupling line and being formed substantially parallel to the first data line in an area of the pixel electrode where the first sub-pixel electrode and the first data line are adjacent to each other; and a second decoupling electrode extending from the decoupling line and being formed substantially parallel to the second data line in an area of the pixel electrode where the first sub-pixel electrode and the second data line are adjacent to each other. A capacitance formed between the decoupling line and the pixel electrode is greater than approximately 5% of a capacitance formed between the pixel electrode and the common electrode and is less than approximately 20% of the capacitance formed between the pixel electrode and the common electrode.

In yet another exemplary embodiment of the present invention, an LCD includes: a decoupling line extending in a first direction; a first data line and a second data line extending in a second direction perpendicular to the first direction; a pixel electrode including a first sub-pixel electrode which receives a first data voltage from the first data line, and a second sub-pixel electrode which receives a second data voltage from the second data line; a first decoupling electrode extending from the decoupling line and being formed substantially parallel to the first data line; and a second decoupling electrode extending from the decoupling line and being formed substantially parallel to the second data line.

It will be understood that both the foregoing description and the following more detailed description are exemplary and explanatory and are intended to provide further explanation of exemplary embodiments of the invention.

BRIEF DESCRIPTION OF THE DRAWINGS

The above and other aspects, features and advantages of the present invention will be more readily apparent by describing in further detail exemplary embodiments thereof with reference to the accompanying drawings, in which.

DETAILED DESCRIPTION OF THE PREFERRED EMBODIMENTS

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper", depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, a liquid crystal display ("LCD") according to an exemplary embodiment of the present invention will be described in further detail with reference to FIGS. 1A through 3. The liquid crystal display according to an exemplary embodiment of the present invention includes a lower substrate (not shown) on which a thin film transistor array (not shown) is formed, an upper substrate (not shown) disposed opposite to, e.g., facing, the lower substrate, and a liquid crystal molecule layer (not shown) interposed between the lower substrate and the upper substrate.

Figure 1A:
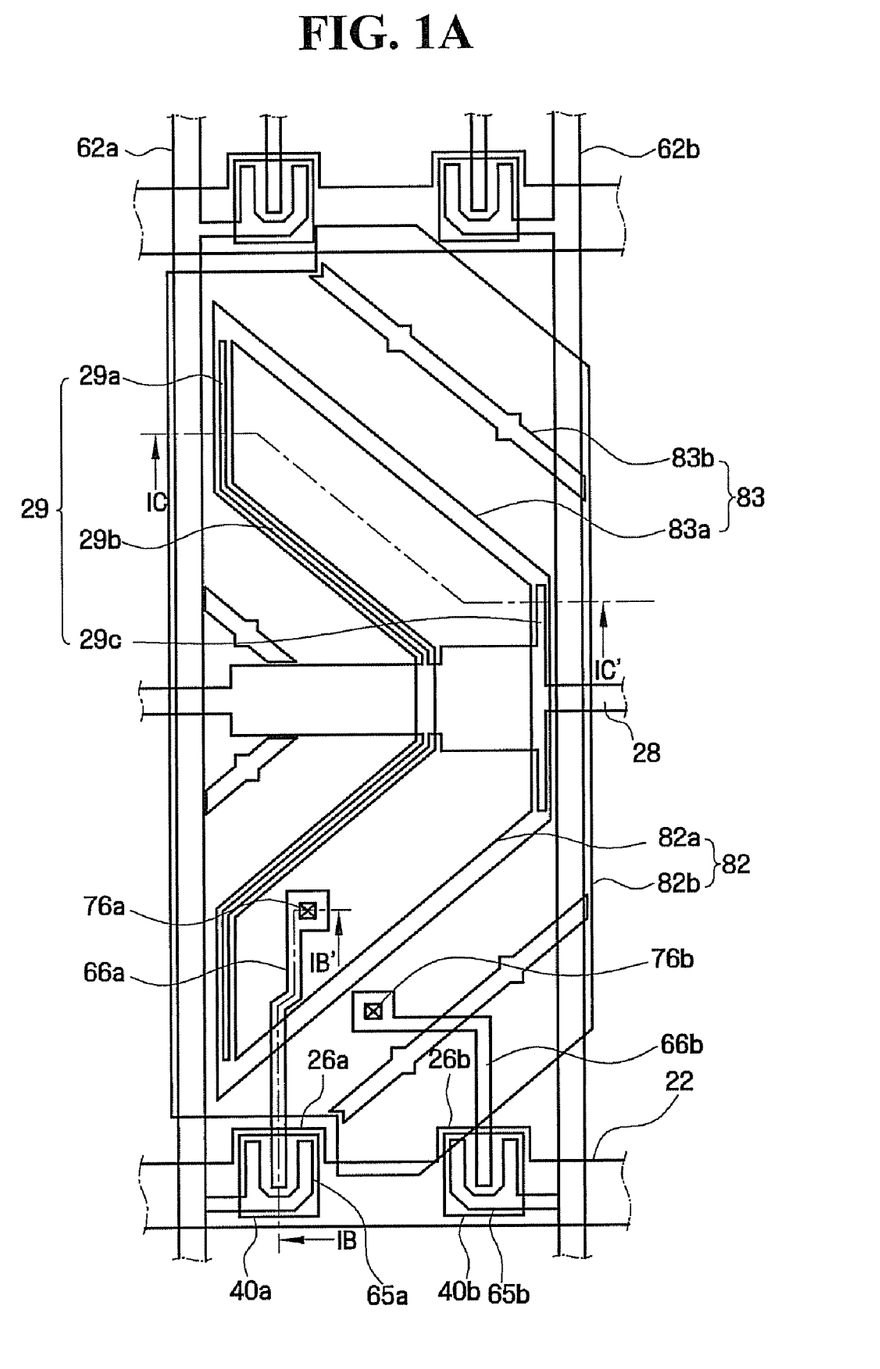
FIG. 1A is a plan view of a lower substrate of a liquid crystal display according to an exemplary embodiment of the present invention.
Figure 1B:
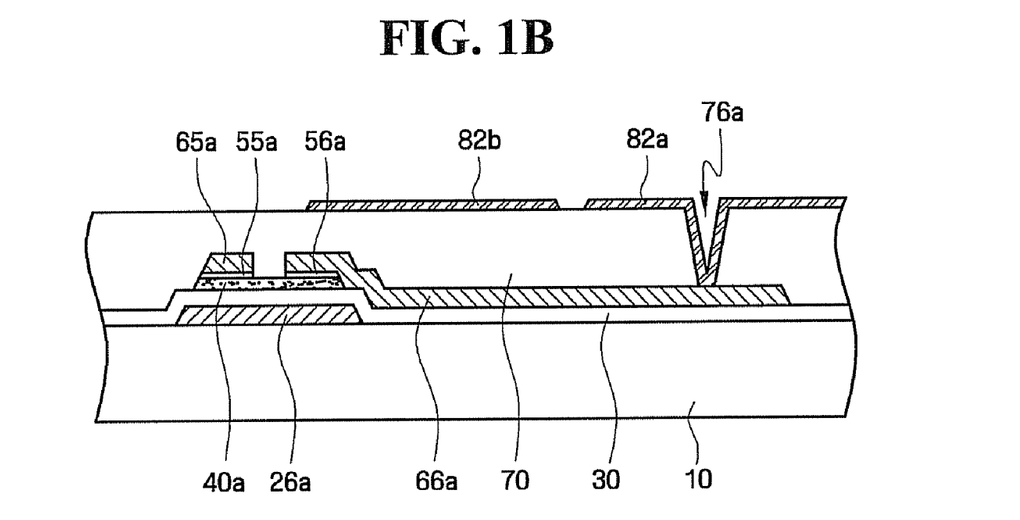
FIG. 1B is a partial cross-sectional view taken along line Ib-Ib' of FIG. 1A.
Figure 1C:
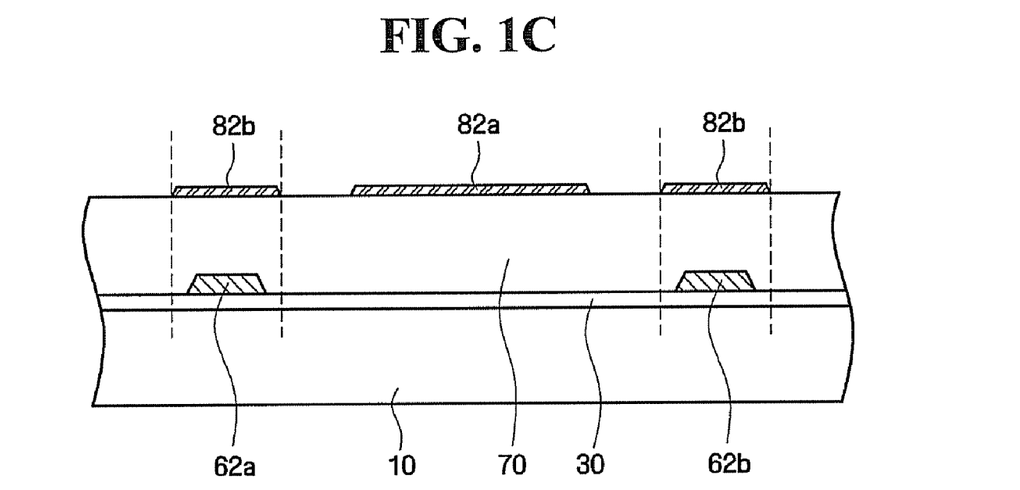
FIG. 1C is a partial cross-sectional view taken along line IC-IC' of FIG. 1A.
Figure 1D:
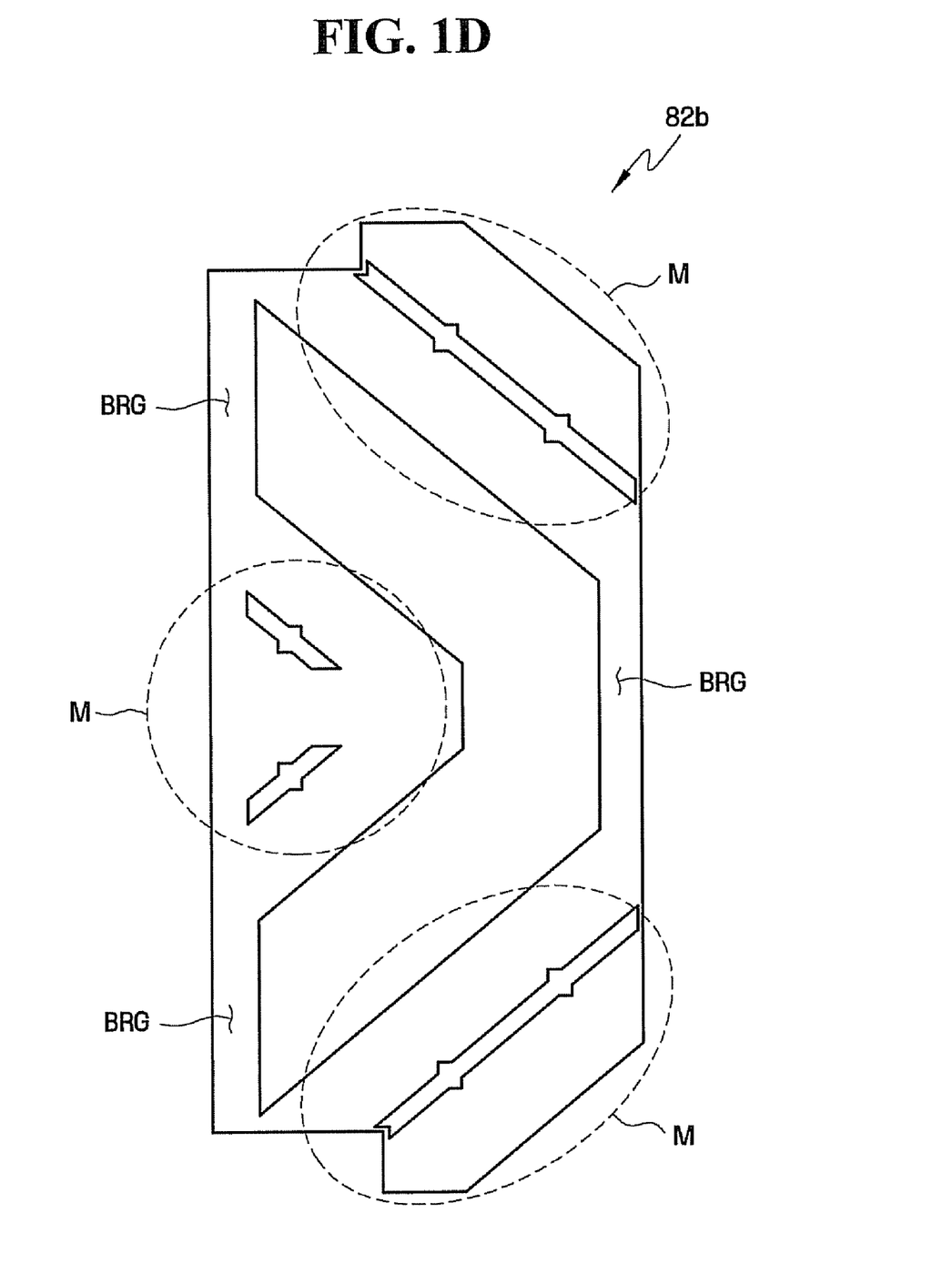
FIG. 1D is a plan view of the second sub-pixel electrode of FIG. 1A.

Referring to FIGS. 1A through 1D, the lower substrate of the liquid crystal display according to an exemplary embodiment of the present invention will now be described in further detail. FIG. 1A is a plan view of a lower substrate of an LCD according to an exemplary embodiment of the present invention, FIG. 1B is a partial cross-sectional view along line Ib-Ib' of FIG. 1A, FIG. 1C is a partial cross-sectional view taken along line IC-IC' of FIG. 1A, and FIG. 1D is a plan view of the second sub-pixel electrode of FIG. 1A.

A gate line 22 extends in a first substantially row direction, e.g., a substantially horizontal direction as viewed in FIG. 1A, on an insulating substrate 10 formed of transparent glass, for example, but not being limited thereto. The gate line 22 transfers a gate signal to a first pixel electrode 82a and a second sub-pixel electrode 82b of a pixel electrode 82.

A decoupling line 28 is disposed along the first direction, e.g., extends substantially parallel to the gate line 22, across a pixel area including the first sub-pixel electrode 82a and the second sub-pixel electrode 82b. The decoupling line 28 transfers a decoupling voltage to a decoupling part 29. In an exemplary embodiment, the decoupling part 29 includes a first decoupling electrode 29a, a second decoupling electrode 29b and a third decoupling electrode 29c. In addition, the decoupling line 28 overlaps at least a portion of the first sub-pixel electrode 82a and the second sub-pixel 82b to form a capacitor which improves a charge conservation capability of a pixel (not shown) of the LCD according to an exemplary embodiment of the present invention. It will be noted that, although the decoupling line 28 overlaps a center portion of the pixel area in the exemplary embodiment shown in FIG. 1A, alternative exemplary embodiments of the present invention are not limited thereto.

In an exemplary embodiment, the decoupling line 28 is used to repair a defective pixel electrode 82. For example, if a specified sub-pixel electrode, e.g., one of the first sub-pixel electrode 82a and the second sub-pixel electrode 82b, becomes defective, the corresponding pixel 82 is turned off by short circuiting the one of the first sub-pixel electrode 82a and the second sub-pixel electrode 82b which is defective with the decoupling line 28 through laser welding, for example.

In an exemplary embodiment, the gate line 22, a first gate electrode 26a and a second gate electrode 26b extending from the gate line 22, and the decoupling line 28 are made of a material such as aluminum (Al) or an aluminum alloy, silver (Ag) or a silver alloy, copper (Cu) or a copper alloy, molybdenum (Mo) or a molybdenum alloy, chrome (Cr), titanium (Ti) and/or tantalum (Ta), for example, but alternative exemplary embodiments are not limited thereto. Also, each of the gate line 22, the first gate electrode 26a, the second gate electrode 26b and the decoupling line 28 may include a multilayer structure having two conductive layers (not shown) each having a different physical property. One of the two conductive layers may be made of metal with low resistivity, such as an aluminum-based metal, a silver-based metal or a copper-based metal, for example, to reduce a signal delay or a voltage drop of the gate line 22, the first gate electrode 26a, the second gate electrode 26b and the decoupling line 28, while the other of the two conductive layers may be made of a material having superior contact characteristics with indium tin oxide ("ITO") and indium zinc oxide ("IZO"), such as a molybdenum-based metal, chrome, titanium or tantalum, for example. Specifically, the multilayer structure according to an exemplary embodiment of the present invention includes a lower chrome layer and an upper aluminum layer, while an alternative exemplary embodiment may include a lower aluminum lower layer and an upper molybdenum layer. However, alternative exemplary embodiments of the present invention are not limited to the foregoing examples.

A gate insulating film 30, which includes silicon nitride ("SiNx"), for example, is disposed on the gate line 22 and the decoupling line 28, as shown in FIGS. 1B and 1C.

Semiconductor layers 40a and 40b, each made of hydrogenated amorphous silicon or polycrystalline silicon, for example, are disposed on the gate insulating layer 30, as shown in FIGS. 1A and 1B. The semiconductor layers 40a and 40b according to exemplary embodiments of the present invention may have various shapes, such as an island shape or a stripe shape, for example, but are not limited thereto. The semiconductor layers 40a and 40b shown in FIG. 1, for example, have substantially rectilinear, e.g., island, shapes, but alternative exemplary embodiments are not limited thereto.

Each of the semiconductor layers 40a and 40b include ohmic contact layers 55a and 56a, which are made of silicide or n+ hydrogenated amorphous silicon doped with high-density n-type impurities, and are disposed on the semiconductor layers 40a and 40b, as shown in FIG. 1B.

A first data line 62a and a second data line 62b, as well as a first drain electrode 66a and a second drain electrode 66b, which correspond to the first data line 62a and the second data line 62b, respectively, are disposed on the ohmic contact layers 55a and 56a and the gate insulating layer 30. Further, the first drain electrode 66a and the second drain electrode 66b are disposed opposite a first source electrode 65a and a second source electrode 65b, respectively, on the semiconductor layers 40a and 40b, respectively, as shown in FIGS. 1A and 1B.

As shown in FIG. 1A, the first data line 62a and the second data line 62b extend substantially in a second direction, e.g., a column direction substantially perpendicular to the first direction.

In an exemplary embodiment, the first data line 62a transfers a first data voltage to the first sub-pixel electrode 82a, and the second data line 62b transfers a second data voltage to the second sub-pixel electrode 82b.

In an exemplary embodiment, the first data line 62a and the second data line 62b overlap at least a portion of the second sub-pixel electrode 82b, but do not overlap the first sub-pixel electrode 82a. For example, in an exemplary embodiment, the first data line 62a and the 62b may be formed to overlap a bridge area BRG of the second sub-pixel electrode 82b, described in further detail below), e.g., to substantially completely overlap width portions, e.g., peripheral portions along the second direction, of the second sub-pixel electrode 82b.

In an exemplary embodiment in which the first data line 62a and the second data line 62b substantially completely overlap the width portions of the second sub-pixel electrode 82b, coupling capacitances formed by the first data line 62a and the second data line 62b and the second sub-pixel electrode 82b may become large and thereby may cause adverse affects. However, a relatively low voltage is applied to the second sub-pixel electrode 82b, as will described below, and thus the second sub-pixel electrode 82b does not operate in a low gray scale region in which luminance difference is sensitive. Also, capacitance formed between the second sub-pixel electrode 82b and the first data line 62a and the second data line 62b becomes larger, relative to a capacitance associated with the first sub-pixel electrode 82a, since the second sub-pixel electrode 82b is wider than the first sub-pixel electrode 82a and is closer to the first data line 62a and the second data line 62b than the first sub-pixel electrode 82a. Thus, a sensitivity to the luminance difference is effectively reduced in the LCD according to an exemplary embodiment by making the second sub-pixel electrode 82b substantially completely overlap the first data line 62a and the second data line 62b. In an exemplary embodiment, the overlap of the second sub-pixel electrode 82b with the first data line 62a and the second data line 62b is substantially bilaterally symmetric.

In an exemplary embodiment, the first data line 62a, the second data line 62b, the first source electrode 65a, the second source electrode 65b, the first drain electrode 66a and the second drain electrode 66b are made of chrome, a molybdenum-based metal, or a refractory metal such as tantalum or titanium, for example, but alternative exemplary embodiments are not limited thereto. Further, the first data line 62a, the second data line 62*b*, the first source electrode 65*a*, the second source electrode 65*b*, the first drain electrode 66*a* and the second drain electrode 66*b* may include a multilayer structure having a lower layer (not shown) made of a refractory metal, for example, and an upper layer (not shown) made of a material having low resistivity, for example. Examples of the multilayer structure include a combination of a lower chrome layer and an upper aluminum layer, and a combination of a lower aluminum layer and an upper molybdenum layer, but alternative exemplary embodiments are not limited thereto. In another alternative exemplary embodiment, the multilayer structure may include a triple-layer structure having three layers comprising molybdenum, aluminum and molybdenum, respectively.

The first source electrode 65*a* and the second source electrode 65*b* at least partially overlap portions of the semiconductor layers 40*a* and 40*b*, respectively. The first drain electrode 66*a* and the second drain electrode 66*b* are disposed opposite the first source electrode 65*a* and the second source electrode 65*b*, respectively, and are substantially centered above the first gate electrode 26*a* and the second gate electrode 26*b*, respectively, and also at least partially overlap the semiconductor layers 40*a* and 40*b*, respectively. The ohmic contact layers 55*a* and 56*a* are disposed between the semiconductor layers 40*a* and 40*b*, the first source electrode 65*a*, the second source electrode 65*b*, the first drain electrode 66*a* and the second drain electrode 66*b* to reduce a contact resistance therebetween.

A passivation layer 70 is formed on the first data line 62*a*, the second data line 62*b*, the first source electrode 65*a*, the second source electrode 65*b*, the first drain electrode 66*a* and the second drain electrode 66*b*, and exposed portions of the semiconductor layers 40*a* and 40*b*. In an exemplary embodiment, the passivation layer 70 is made of an inorganic material, such as silicon nitride or silicon oxide, for example or, alternatively, an organic material having photosensitivity and superior smoothing characteristics, or a low dielectric material, such as a-Si:C:O and a-Si:O:F, formed by plasma enhanced chemical vapor deposition ("PECVD"), for example, but alternative exemplary embodiments are not limited to the foregoing description. Also, the passivation layer 70 in an alternative exemplary embodiment may include a double-layer structure having a lower inorganic layer and an upper organic layer, for example, to protect exposed portions of the semiconductor layers 40*a* and 40*b* while taking advantage of superior characteristics of the upper organic layer. In another exemplary embodiment, the passivation layer 70 includes a red, green and/or blue ("RGB") color filter layer (not shown).

The first sub-pixel electrode 82*a* and the second sub-pixel electrode 82*b* are disposed on the passivation layer 70, as shown in FIGS. 1B and 1C. The first sub-pixel electrode 82*a* and the second sub-pixel electrode 82*b* are physically and electrically connected to the first drain electrode 66*a* and the second drain electrode 66*b*, respectively, through contact holes 76*a* and 76*b*, respectively, to receive the first data voltage, and the second data voltage, respectively, therefrom. In an exemplary embodiment, the first pixel electrode 82*a* and the second pixel electrode 82*b* are made of a transparent conductive material, such as ITO or IZO, for example, or a reflective conductive material such as aluminum, for example, but alternative exemplary embodiments are not limited thereto.

Thus, in the LCD according to an exemplary embodiment, the pixel electrode 82 includes the first sub-pixel electrode 82*a* and the second sub-pixel electrode 82*b*, as described above. Further, the first sub-pixel electrode 82*a* is connected to the gate line 22 and the first data line 62*a* via a switching element (not specifically shown), and receives the gate signal and the first data voltage. Likewise, the second sub-pixel electrode 82*a* is connected to the gate line 22 and the second data line 62*b* via a switching element (not specifically shown), and receives the gate signal and the second data voltage. In an exemplary embodiment, the first data voltage is greater than a common voltage, while the second data voltage less than the common voltage.

In an exemplary embodiment, the first sub-pixel electrode 82*a* has a shape of a "V", and the second sub-pixel electrode 82*b* is formed to substantially surround the first sub-pixel electrode 82*a* in the pixel area, as shown in FIG. 1A.

In addition, the second sub-pixel electrode 82*b* is divided into a main area M which is disposed at an angle of approximately 45° or approximately −45° with respect to the gate line 22, e.g., with respect to the first direction. The main area M controls movement of liquid crystal molecules therein. The second sub-pixel 82*b* is further divided into a bridge area BRG disposed substantially along the first data line 62*a* and the second data line 62*b* and is connected to the main area M, as shown in FIG. 1A. Further, the first data line 62*a* and the second data line 62*b* substantially overlap the bridge area BRG, and thus overlap the width portions of the second sub-pixel electrode 82*b*, as described above.

As a result, during operation of the liquid crystal display according to an exemplary embodiment, overall luminance is high in a high gray scale operation region, and any light leakage does not cause significant problems. However, in a low gray scale operating region, it is important to prevent light leakage. In particular, the light leakage generally occurs in an area proximate to the first data line 62*a* and the second data line 62*b*.

Therefore, in an exemplary embodiment of the present invention, a relatively high data voltage, e.g., the first data voltage, is applied to the first sub-pixel electrode 82*a*, and a relatively low data voltage, e.g., the second data voltage, is applied to the second sub-pixel electrode 82*b*. Thus, in the low gray scale operation region, liquid crystal molecules disposed on the second sub-pixel electrode 82*b*, to which the relatively low data voltage is applied, are aligned so that directors thereof are at substantially right angles with respect to a surface of the lower substrate (not shown). Accordingly, light emitted from a backlight (not shown) is blocked, e.g., does not pass through the second sub-pixel electrode 82*b*.

Accordingly, by disposing the second sub-pixel electrode 82*b* to substantially overlap the first data line 62*a* and the second data line 62*b*, the second sub-pixel electrode 82*b* effectively blocks light generated proximate to the first data line 62*a* and the second data line 62*b* in the low gray scale operation region, and thus light leakage is substantially reduced and/or effectively prevented in the LCD according to an exemplary embodiment of the present invention.

Referring to FIG. 1A, a lower domain-dividing part 83 is formed on the first pixel electrode 82*a* and the second pixel electrode 82*b*. The lower domain-dividing part 83 divides the first pixel electrode 82*a* and the second pixel electrode 82*b* into domains. When an electric field is formed between each of the first pixel electrode 82*a* and the second pixel electrode 82*b* and a common electrode 90 (FIG. 2), display areas of the first pixel electrode 82*a* and the second pixel electrode 82*b* are divided into a plurality of domains based on the direction in which the main directors of the liquid crystal molecules are arranged, as described above, and the liquid crystal molecules in a specified domain are thereby slanted in a specified direction in groups.

The lower domain-dividing part 83 includes a first lower domain-dividing part 83a and a second lower domain-dividing part 83b.

The first lower domain-dividing part 83a electrically separates the first sub-pixel electrode 82a from the second sub-pixel electrode 82b. In an exemplary embodiment, the first lower domain-dividing part 88a is a gap, as shown in FIG. 1A, with the first sub-pixel electrode 82a and the second sub-pixel electrode 82b engaged with each other via the first lower domain-dividing part 83a. Alternatively, the first lower domain-dividing part 83a may be divided into a slanting part disposed at an angle of approximately 45° or approximately −45° with respect to the gate line 22, and a straight part connected between the slanting part and disposed substantially in the second direction, e.g., substantially parallel to the first data line 62a and the second data line 62b.

The second lower domain-dividing part 83b may be formed on the first sub-pixel electrode 82a and the second sub-pixel electrode 82b at an angle of approximately 45° or approximately −45° with respect to the gate line 22. Further, the second lower domain-dividing part 83b, may be formed in the form of a cutout or a protrusion for example, but alternative exemplary embodiments are not limited thereto.

The switching element includes thin film transistors ("TFTs"). The thin film transistors according to an exemplary embodiment are three-terminal elements including the first gate electrode 26a or the second gate electrode 26b connected to the gate line 22, the first source electrode 65a or the second source electrode 65b connected to the first data line 62a or the second data line 62b, respectively, and the first drain electrode 66a or the second drain electrode 66b connected to the first sub-pixel electrode 82a or the second sub-pixel electrode 82b, respectively.

The first decoupling electrode 29a, the second decoupling electrode 29b and the third decoupling electrode 29c are connected to the decoupling line 28, and receive the decoupling voltage. Operation of the first decoupling electrode 29a, the second decoupling electrode 29b and the third decoupling electrode 29c will now be described in further detail.

Coupling may occur between the first sub-pixel electrode 82a and the second sub-pixel electrode 82b and the first data line 62a and the second data line 62b disposed at opposite sides of the first sub-pixel electrode 82a and the second sub-pixel electrode 82b. The liquid crystal display including the first sub-pixel electrode 82a and the second sub-pixel electrode 82b is thereby driven utilizing a column inversion drive method, for example, which is a high-speed driving method. As a result, if coupling capacitances formed between the first sub-pixel electrode 82a and the first data line 62a and the second data line 62b are different and/or coupling capacitances formed between the second sub-pixel electrode 82b and the first data line 62a and the second data line 62b are different, a luminance deviation may occur.

However, a relatively high data voltage, e.g., the first data voltage, is applied to the first sub-pixel electrode 82a, and a capacitance formed between the first sub-pixel electrode 82a and the first data line 62a and the second data line 62b is relatively small, as described above. Accordingly, a difference between the coupling capacitance formed between the first sub-pixel electrode 82a and the first data line 62a and the coupling capacitance formed between the first sub-pixel electrode 82a and the second data line 62b affects the display quality of the liquid crystal display, as will now be described in further detail.

In an exemplary embodiment of the present invention, the first decoupling electrode 29a and the second decoupling electrode 29b are both disposed between the first sub-pixel electrode 82a and the first data line 62a, while the third decoupling electrode 29c is disposed between the first sub-pixel electrode 82a and the second data line 62b. Accordingly, the difference between the coupling capacitance formed between the first sub-pixel electrode 82a and the first data line 62a and the coupling capacitance formed between the first sub-pixel electrode 82a and the second data line 62b is effectively reduced. In an exemplary embodiment, a DC voltage such as a common voltage, for example, is applied to the first decoupling electrode 29a, the second decoupling electrode 29b and the third decoupling electrode 29c as the decoupling voltage. In an alternative exemplary embodiment, however, a voltage having a ripple may be applied as the decoupling voltage.

Referring to FIG. 1A, the first decoupling electrode 29a and the second decoupling electrode 29b according to an exemplary embodiment a first decoupling electrode straight part 29a and a second decoupling electrode slanting part 29b, respectively, (hereinafter referred to as a straight part 29a and a slanting part 29b, respectively). The straight part 29a extends from the slanting part 29b in substantially the second direction, and is thereby be formed along the first data line 62a in an area where the first sub-pixel electrode 82a and the first data line 62a are adjacent to each other. Also, the slanting part 29b extends from the decoupling line, and is formed to be at an angle of approximately 45° or approximately −45° with respect to the first direction along which the gate line 22 is disposed.

In an exemplary embodiment, the first decoupling electrode 29a, the second decoupling electrode 29b and the third decoupling electrode 29c are disposed to overlap at least a portion of the lower domain-dividing part 83. For example, as shown in the FIG. 1A, the straight part 29a of the first decoupling electrode 29a and the third decoupling electrode 29c are disposed to overlap a corresponding straight portion of the first lower domain-dividing part 83a, while the slanting part 29b of the second decoupling electrode 29b is disposed to overlap a corresponding slanting portion of the first lower domain-dividing part 83a.

In an alternative exemplary embodiment, the straight part 29a of the first decoupling electrode 29a and the third decoupling electrode 29c may be disposed to overlap the straight part of the first lower domain-dividing part 83a, and the slanting part 29b of the second decoupling electrode 29b may be disposed to overlap the second lower domain-dividing part 83b. When the first decoupling electrode 29a, the second coupling electrode 29b and the third decoupling electrode 29c are disposed to overlap the lower domain-dividing part 83, an aperture ratio of the LCD according to an exemplary embodiment is substantially increased, since an area occupied by the lower domain-dividing part 83 does not adversely affect the aperture ratio of the LCD.

An alignment layer (not shown) for aligning the liquid crystal layer may be disposed on the first sub-pixel electrode 82a, the second sub-pixel electrode 82b and the passivation layer 70.

Figure 2:
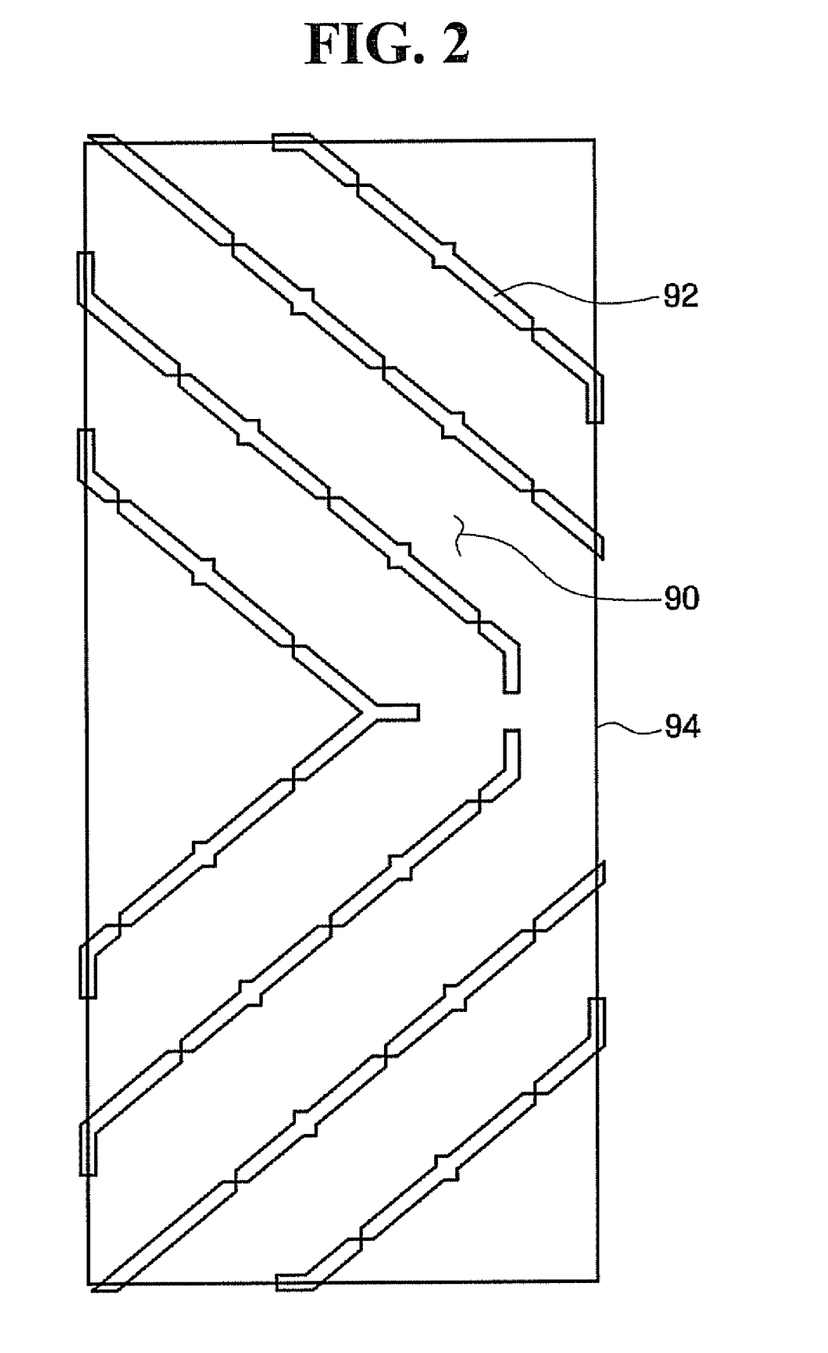
FIG. 2 is a plan view of an upper substrate coupled to the lower substrate of the LCD according to the exemplary embodiment of the present invention shown in FIG. 1A.
Figure 3:
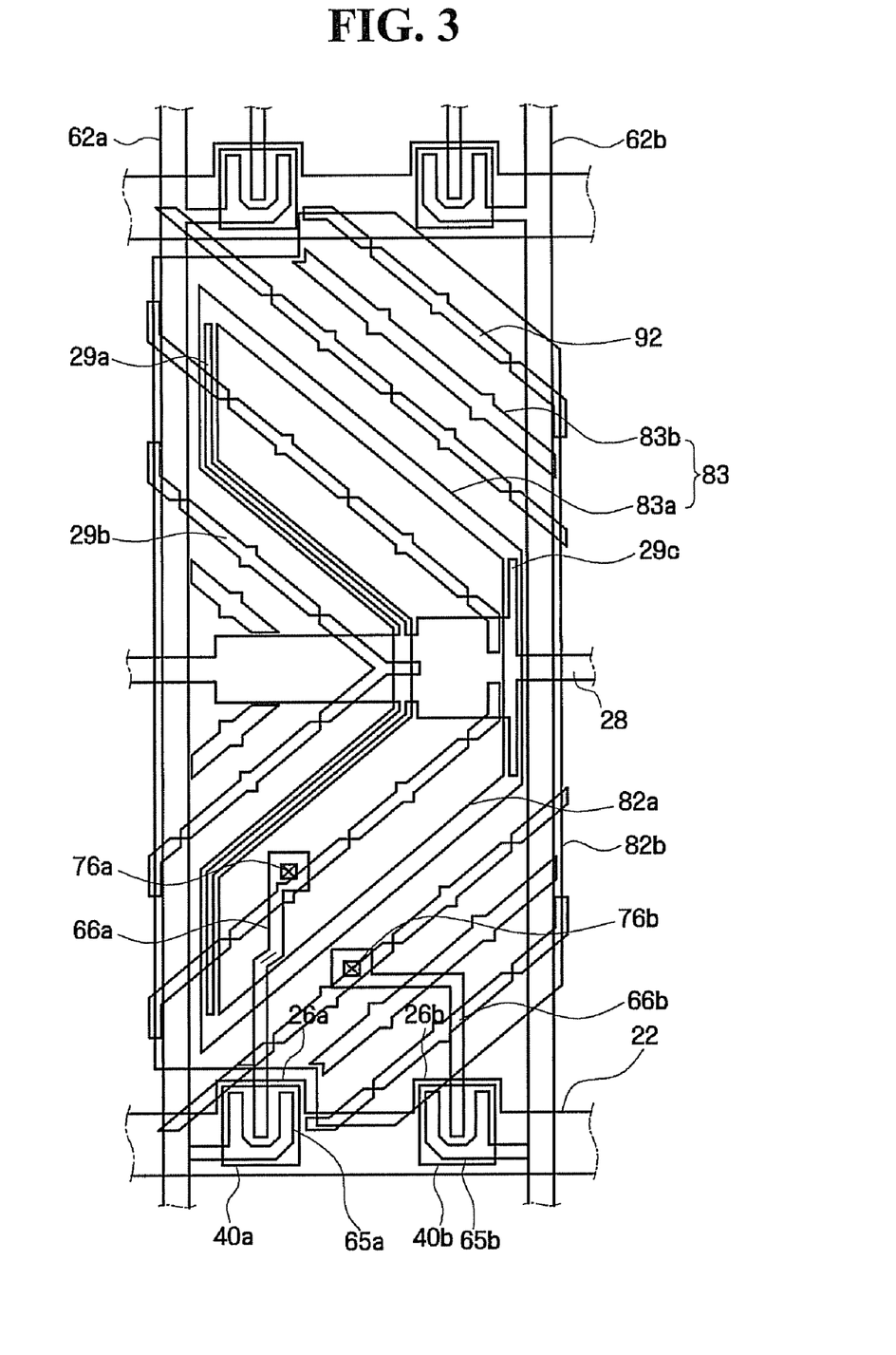
FIG. 3 is a plan view of a liquid crystal display according to an exemplary embodiment of the present invention.

The upper substrate and the liquid crystal display will now be described in further detail with reference to FIGS. 2 and 3. FIG. 2 is a plan view of an upper substrate coupled to the lower substrate according to the exemplary embodiment of the present invention shown in FIG. 1A, and FIG. 3 is a plan view of a liquid crystal display according to an exemplary embodiment including the lower substrate according to the exemplary embodiment of the present invention shown in FIG. 1A and the upper substrate according to the exemplary embodiment of the present invention shown in FIG. 2.

Referring now to FIG. 2, a black matrix 94, which prevents light leakage and defines a pixel area, is formed on an insulating substrate (not shown) of the upper substrate. The insulating substrate is made of transparent glass, for example, but alternative exemplary embodiments are not limited thereto. The black matrix 94 may be formed on a part corresponding to the gate line 22 and the first and second data lines 62a and 62b and a part corresponding to a thin film transistor (not illustrated) of the lower substrate (see FIGS. 1A-1C).

In alternative exemplary embodiments, the black matrix 94 may include various shapes to block light leakage proximate to the first sub-pixel electrode 82a and the second sub-pixel electrode 82b and the thin film transistor. Further, the black matrix 94 may be made of metal (or metal oxide) such as chrome or chrome oxide, or, alternatively, organic black resist, for example, but alternative exemplary embodiments are not limited thereto.

Red, green and blue color filters (not shown) are disposed in the pixel area adjacent black matrices 94, and an overcoat layer (not shown) which smooth an unevenness of the color filters is formed on the color filters.

A common electrode 90 made of a transparent conductive material such as ITO or IZO, for example, is formed on the overcoat layer. The common electrode 90 is disposed opposite to the first sub-pixel electrode 82a and the second sub-pixel electrode 82b, and receives the common voltage. A liquid crystal molecule layer (not shown) is interposed between both the first pixel electrode 82a and the second pixel electrode 82b and the common electrode 90 to form a liquid crystal capacitor (not shown). The liquid crystal capacitor maintains an applied voltage, e.g., a data voltage, after switch element, e.g., the TFT (not illustrated), is turned off.

An upper domain-dividing part 92 is formed on the common electrode 90. The upper domain-dividing part 92 may be formed at an angle of approximately 45° or approximately −45° with respect to the first direction in which the gate line 22 is substantially disposed (see FIG. 1A). In an exemplary embodiment, the upper domain-dividing part 92 may be, for example, in the form of a cutout or a projection, but alternative exemplary embodiments are not limited thereto.

An alignment layer (not shown) which aligns the liquid crystal molecules (not shown) may be formed on the common electrode 90.

The LCD according to an exemplary embodiment of the present invention is formed by arranging and combining the lower substrate and the upper substrate, injecting a liquid crystal material (not shown) between the lower substrate and the upper substrate, and vertically aligning the injected liquid crystal material therein. Elements such as polarizers and/or a backlight, for example, are then disposed in the LCD. Specifically, the polarizers are disposed on opposite sides of the LCD, and a transmission axis of one of the polarizers is disposed to be substantially parallel to the first direction, e.g., substantially parallel to the gate line 22 (FIG. 1A), while a transmission axis of another one of the polarizers is disposed substantially parallel to the second direction, e.g., substantially perpendicular to the gate line 22.

The liquid crystal molecules are aligned such that directors thereof are substantially perpendicular to the lower substrate and the upper substrate when no electric field is applied between each of the first pixel electrode 82a and the second pixel electrode 82b and the common electrode 90. Further, the liquid crystal molecules according to an exemplary embodiment have a negative dielectric anisotropy.

When an electric field is applied between the lower substrate and the upper substrate, an electric field substantially perpendicular to the two substrates is formed therein, while a substantially horizontal electric field is formed proximate to the upper domain-dividing part 92 and the lower domain-dividing part 83. The substantially horizontal electric field aligns the liquid crystal molecules in the domains.

Since the liquid crystal molecules have negative dielectric anisotropy, the liquid crystal molecules in the respective domains are slanted in a direction substantially perpendicular to each of the upper domain-dividing part 92 and the lower domain-dividing part 83, when an electric field is applied thereto. Accordingly, the liquid crystal molecules at both sides of the upper domain-dividing part 92 and the lower domain-dividing part 83 are slanted in substantially opposite directions to each other, and the slanting parts of the upper domain-dividing part 92 and the lower domain-dividing part 83 are symmetrically formed around the center of the pixel, the liquid crystal molecules are substantially at an angle of approximately 45° or approximately −45° with respect to the gate line 22, e.g., are thereby slanted in four directions. Therefore, a viewing angle is effectively increased, e.g., widened, in the LCD according to an exemplary embodiment, since optical characteristics are compensated for by the liquid crystal molecules which are slanted in the four directions.

Figure 4:
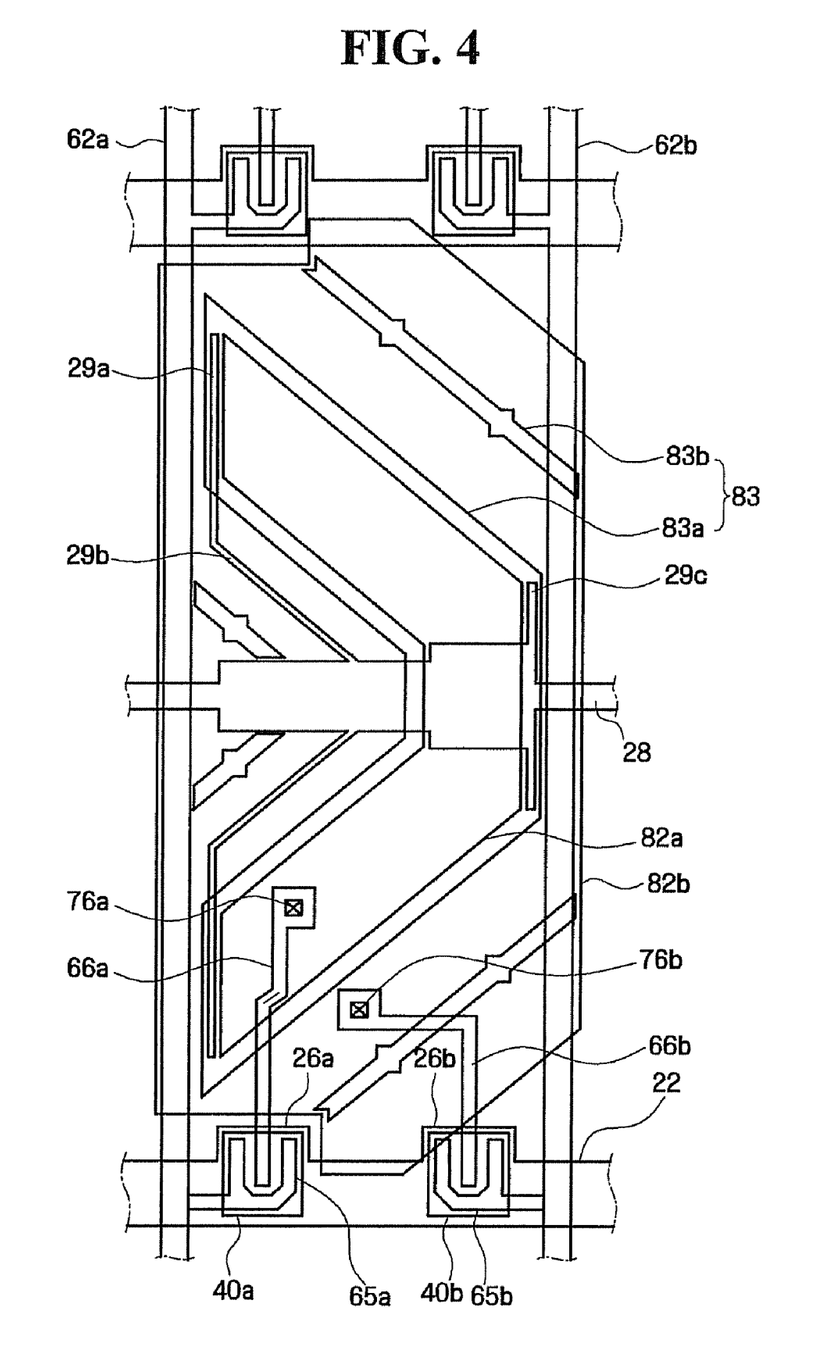
FIG. 4 is a plan view of a lower substrate of a liquid crystal display according to an alternative exemplary embodiment of the present invention.
Figure 5:
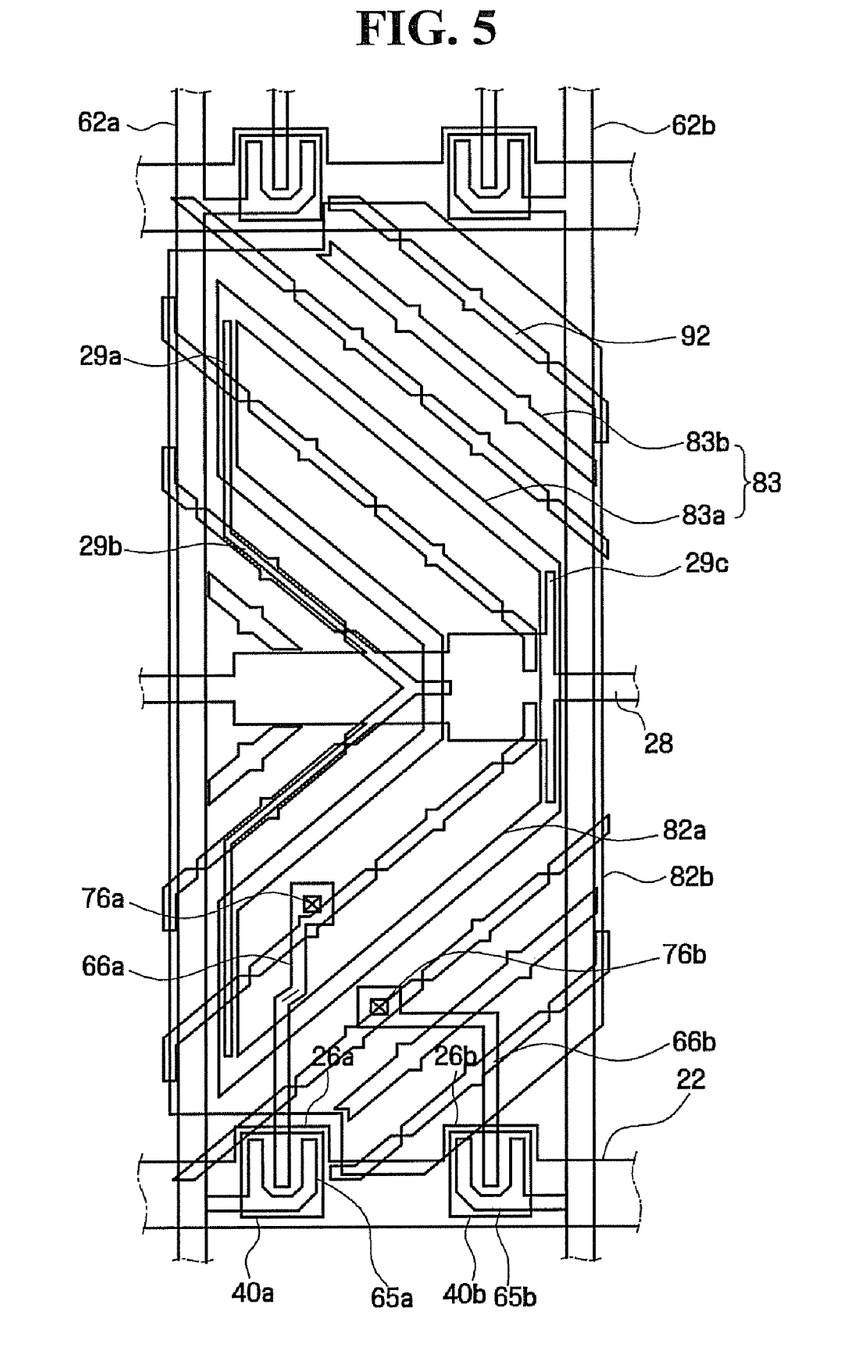
FIG. 5 is a plan view of a liquid crystal display including the lower substrate according to the exemplary embodiment of the present invention shown in shown in FIG. 4 and the upper substrate according to the exemplary embodiment of the present invention shown in FIG. 2.

Hereinafter, a liquid crystal display according to an alternative exemplary embodiment of the present invention will be described in further detail with reference to FIGS. 4 and 5. FIG. 4 is a plan view of a lower substrate according to an alternative exemplary embodiment of the present invention, and FIG. 5 is a plan view of a liquid crystal display according to an exemplary embodiment including the lower substrate according to the exemplary embodiment of the present invention shown in FIG. 4 and the upper substrate according to the exemplary embodiment of the present invention shown in FIG. 2. For purposes of explanatory convenience, elements having the same or like functions as corresponding elements described above will be denoted by the same reference numerals, and thus and repetitive detailed description thereof will hereinafter be omitted. The liquid crystal display according to an alternative exemplary embodiment of the present invention will now be described.

In an exemplary embodiment, the slanting part 29b, e.g., the second decoupling electrode 29b, is disposed to substantially overlap the upper domain-dividing part 92. For example, as shown in FIG. 3, the straight part 29a, e.g., the first decoupling electrode 29a and the third decoupling electrode 29c may be disposed to substantially overlap the straight part of the first lower domain-dividing part 83a, and the slanting part 29b may be disposed to substantially overlap the upper domain-dividing part 92.

In an alternative exemplary embodiment, a part of the upper domain-dividing part 92 is formed substantially parallel to the first data line 62a and the second data line 62b between the first sub-pixel electrode 82a and each of the first data line 62a and the second data line 62b (not shown), while the straight part 29a and the third decoupling electrode 29c overlap the part of the upper domain-dividing part 92.

When the straight part 29a, the slanting part 29b and/or the third decoupling electrode 29c substantially overlap the upper domain-dividing part 92, as described above, an aperture ratio of the LCD according to an exemplary embodiment of the present invention is substantially increased and/or effectively maximized, since an area occupied by the upper domain-dividing part 92 does not adversely affect the aperture ratio.

Figure 6:
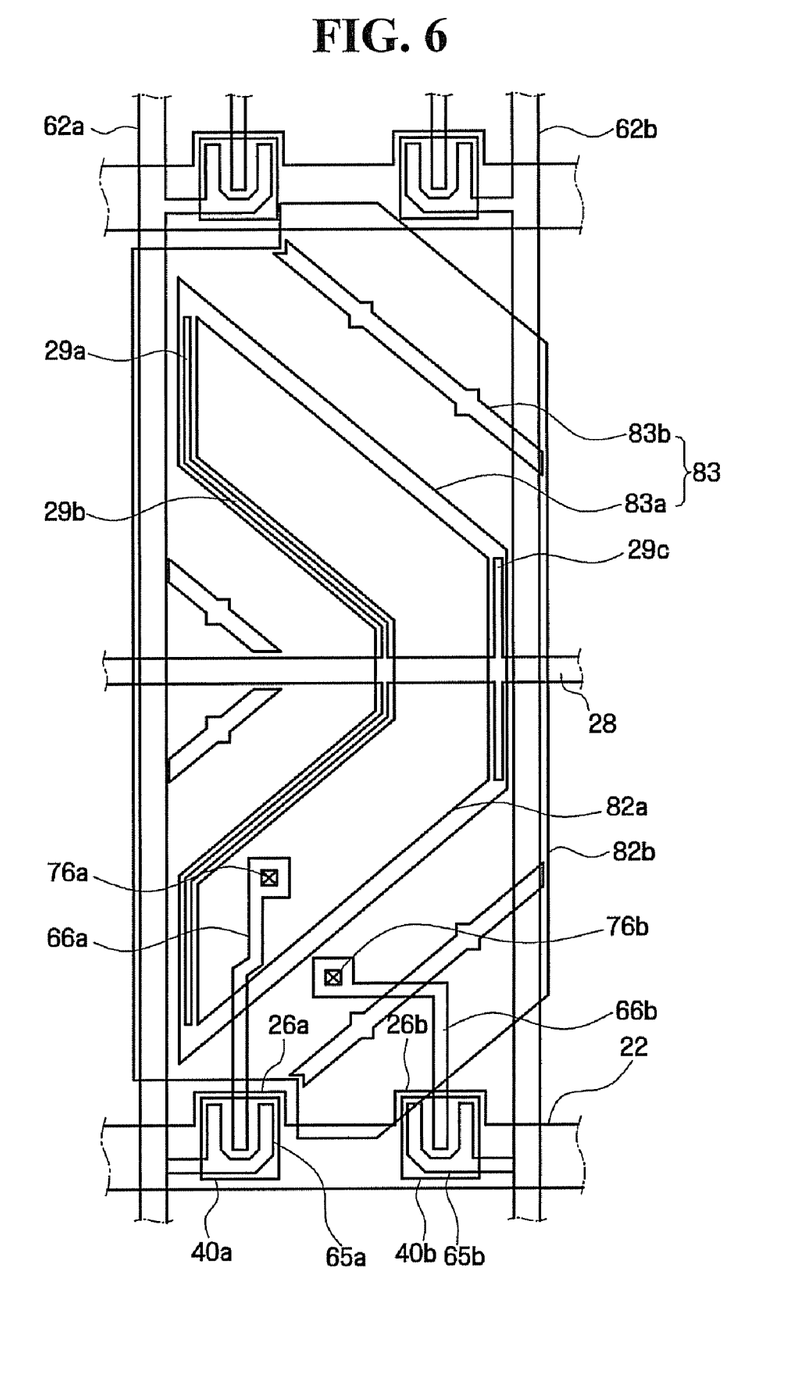
FIG. 6 is a plan view of a lower substrate of a liquid crystal display according to yet another alternative exemplary embodiment of the present invention.

Hereinafter, a liquid crystal display according to yet another alternative exemplary embodiment of the present invention will be described in further detail with reference to FIG. 6. FIG. 6 is a plan view of a lower substrate according to an alternative exemplary embodiment of the present invention. For purposes of explanatory convenience, elements having the same or like functions as corresponding elements as described above will be denoted by the same reference numerals, and thus any repetitive detailed description thereof will hereinafter be omitted. The liquid crystal display according an alternative exemplary embodiment of the present invention will now be described.

By reducing a width of the decoupling line 28, a capacitance formed between the decoupling line 28 and the pixel electrode 83 is effectively reduced. Specifically, the capacitance formed between the decoupling line 28 and the pixel electrode 83 to be in a range of more than approximately 5% of the liquid crystal capacitance formed between the pixel electrode 83 and the common electrode 90 (see FIG. 2) and less than approximately 20% of the capacitance formed between the pixel electrode 83 and the common electrode 90. In an exemplary embodiment having the reduced width of the decoupling line 28, the width of the decoupling line 28 is in a range of more than approximately 5 μm and less than approximately 15 μm.

As described above, when the capacitance between the decoupling line 28 and the pixel electrode 83 is reduced, an amount of charge the thin film transistor supplies to the pixel electrode 83 is decreased. As a result, a required size of the thin film transistor is reduced. Accordingly, the liquid crystal display according to an exemplary embodiment has additional advantages including being lighter, thinner, and having reduced power consumption. It will be noted that, even when the capacitance formed between the decoupling line 28 and the pixel electrode 83 is reduced, a desired voltage holding ratio ("VHR") is maintained in the LCD according to an exemplary embodiment, since the liquid crystal molecules thereof have a high dielectric constant.

In addition, when the width of the decoupling line 28 is reduced, an area occupied by the decoupling line 28 is effectively reduced, and a portion of the area of the decoupling line 28 which blocks light provided from the backlight (not shown) is thereby reduced, further increasing an aperture ratio of the LCD according to an exemplary embodiment.

In an exemplary embodiment, the width of the decoupling line 28 may be set to be more than approximately 5 μm, in order to effectively reduce a coupling capacitance between the first sub-pixel electrode 82a and the first data line 62a, as well as a coupling capacitance between the first sub-pixel electrode 82a and the second data line 62b, thereby allowing the decoupling line 28 to stably supply the decoupling voltage to the first decoupling electrode 29a, the second decoupling electrode 29b and the third decoupling electrode 29c.

Figure 7:
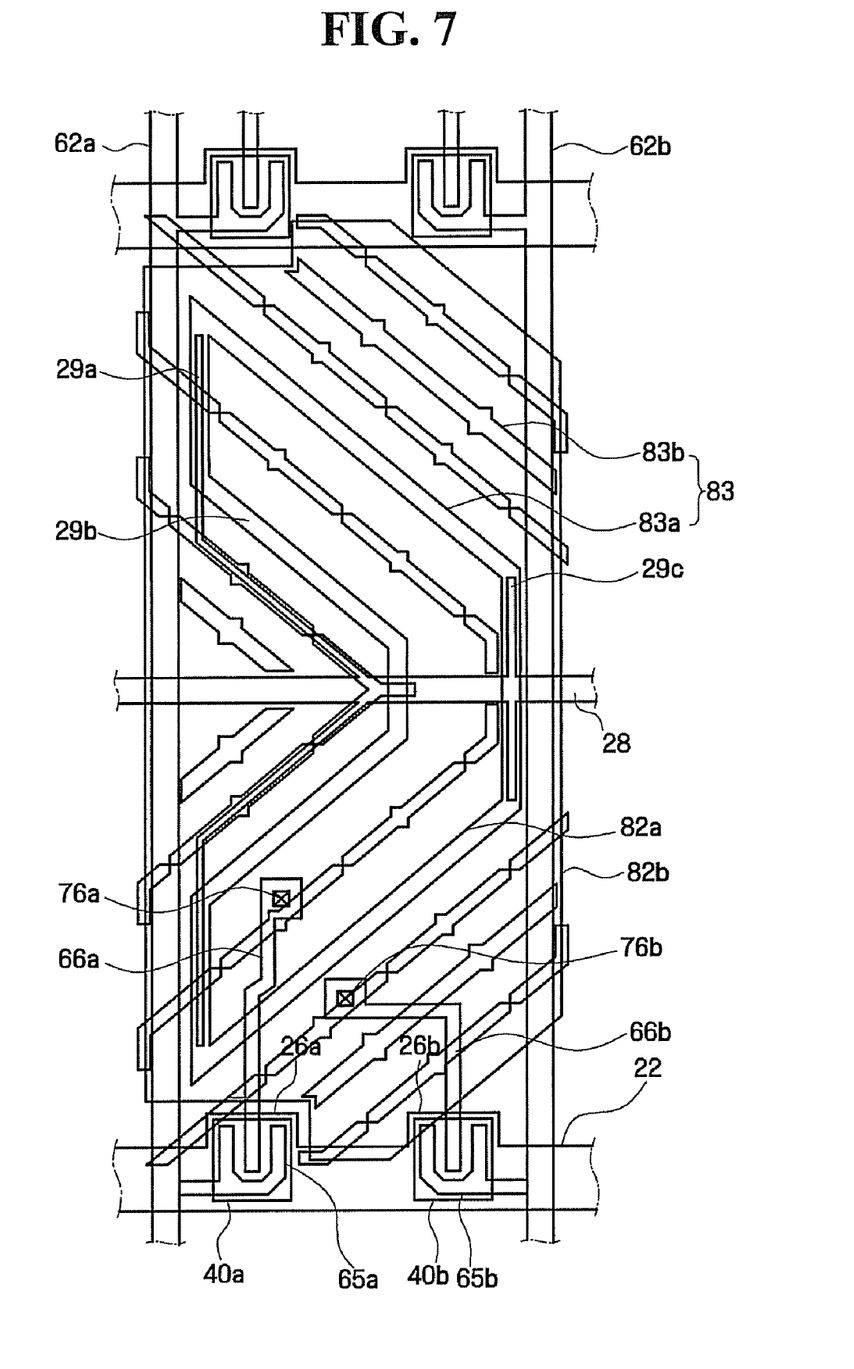
FIG. 7 is a plan view of a liquid crystal display including a lower substrate according to an alternative exemplary embodiment of the present invention and the upper substrate of the exemplary embodiment of the present invention shown in FIG. 2.

Hereinafter, a liquid crystal display according to still another alternative exemplary embodiment of the present invention will be described in further detail, with reference to FIG. 7. FIG. 7 is a plan view of a liquid crystal display according to an alternative exemplary embodiment including a lower substrate according to an alternative exemplary embodiment of the present invention and the upper substrate according to the exemplary embodiment of the present invention shown in FIG. 2. For purposes of explanatory convenience, elements having the same or like functions as corresponding elements described above will be denoted by the same reference numerals, and thus any repetitive detailed description thereof will hereinafter be omitted. The liquid crystal display according to an alternative exemplary embodiment of the present invention will now be described.

In an exemplary embodiment, the slanting part 29b, e.g., the first decoupling electrode 29b, is disposed to substantially overlap the upper domain-dividing part 92. For example, as shown in FIG. 7, the straight part 29a and the third decoupling electrode 29c may be disposed to overlap the straight part of the first lower domain-dividing part 83a, while the slanting part 29b may be disposed to overlap the upper domain-dividing part 92.

In an alternative exemplary embodiment, however, when a part of the upper domain-dividing part 92 is formed substantially parallel to the first data line 62a and the second data line 62b between the first sub-pixel electrode 82a and each of the first data line 62a and the second data line 62b (not shown), the straight part 29a and the third decoupling electrode 29c substantially overlap the part of the upper domain-dividing part 92.

When straight part 29a, the slanting part 29b, and/or the third decoupling electrode 29c substantially overlap the upper domain-dividing part 92, as described above, an aperture ratio of the LCD according to an exemplary embodiment of the present invention is substantially increased.

Figure 8:
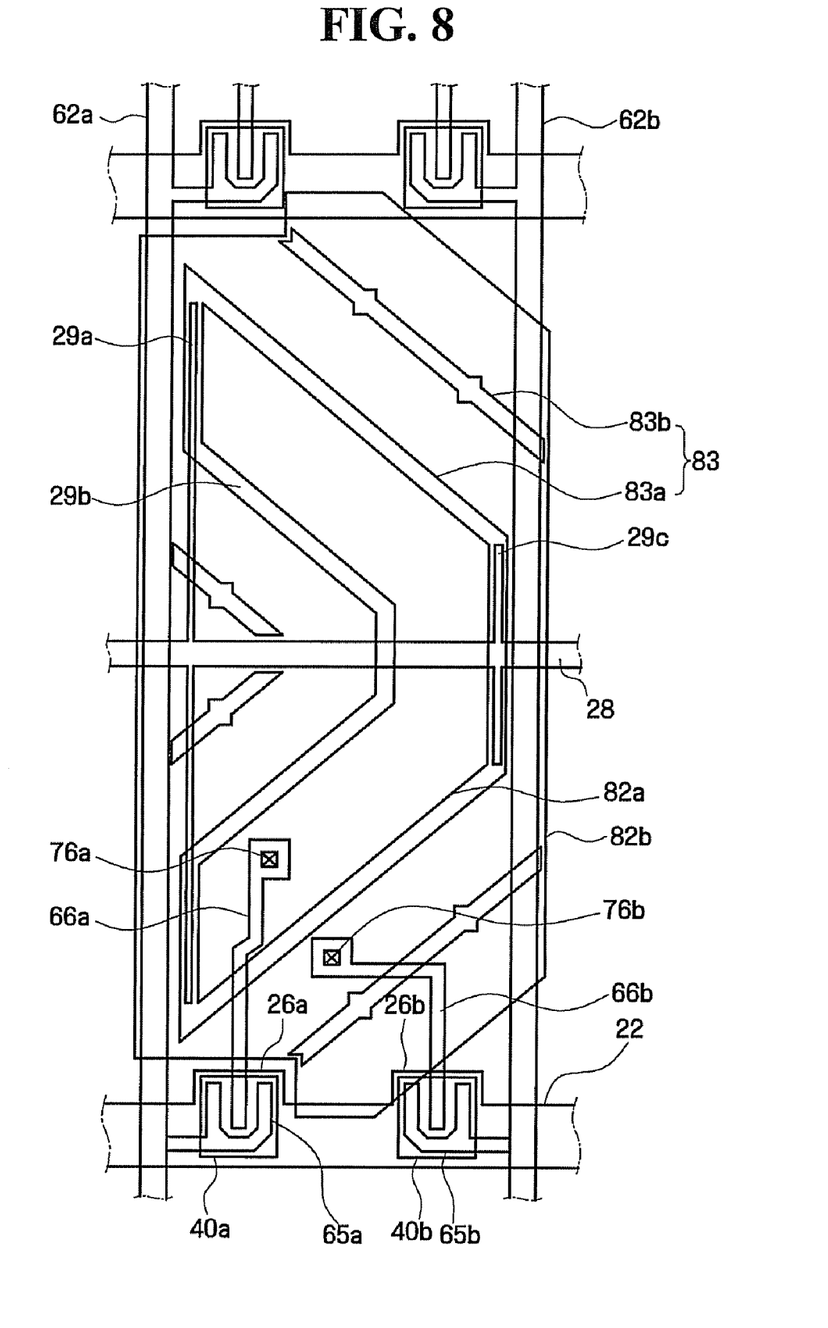
FIG. 8 is a plan view of a lower substrate of a liquid crystal display according to still another alternative exemplary embodiment of the present invention.

Hereinafter, a liquid crystal display according to another exemplary embodiment of the present invention will be described in further detail, with reference to FIG. 8. FIG. 8 is a view of a lower substrate according to an alternative exemplary embodiment of the present invention. For purposes of explanatory convenience, elements having the same or like functions as corresponding elements described above will be denoted by the same reference numerals, and thus any repetitive detailed description thereof will hereinafter be omitted. The liquid crystal display according to an exemplary embodiment of the present invention will now be described.

In an exemplary embodiment of the present invention, the first decoupling electrode 29a extends substantially perpendicularly away from the decoupling line 28 in the second direction, e.g., is disposed substantially parallel to the first data line 62a in an area where the first sub-pixel electrode 82a and the first data line 62a are adjacent to each other. Likewise, the third decoupling electrode 29c extends substantially perpendicularly away from the decoupling line 28, and is also disposed along the second direction, e.g., substantially parallel to the second data line 62b in an area where the first sub-pixel electrode 82a and the second data line 62b are adjacent to each other.

Thus, the first decoupling electrode 29a is disposed between the first sub-pixel electrode 82a and the first data line 62a, and the third decoupling electrode 29c is disposed between the first sub-pixel electrode 82a and the second data line 62b, such that the first decoupling electrode 29a and the third decoupling electrode 29c receive the decoupling voltage. Accordingly, a difference between a coupling capacitance formed between the first sub-pixel electrode 82a and the first data line 62a, and a coupling capacitance formed between the first sub-pixel electrode 82a and the second data line 62b is effectively reduced.

In an exemplary embodiment, the first decoupling electrode 29a and the third decoupling electrode 29c may be disposed to substantially overlap the lower domain-dividing part 83 and/or the upper domain-dividing part 92. For example, as illustrated in FIG. 8, a part of each of the first decoupling electrode 29a and the third decoupling electrode 29c may overlap respective corresponding straight parts of the first lower domain-dividing part 83a.

In an alternative exemplary embodiment, when a part of the upper domain-dividing part 92 and/or a part of the second lower domain-dividing part 83b is formed substantially parallel to the first data line 62a and the second data line 62b between the first sub-pixel electrode 82a and each of the first data line 62a and the second data line 62b, a part of the third decoupling electrode 29c and the first decoupling electrode 29a may overlap the part of the second lower domain-dividing part 83b.

When the first decoupling electrode 29a and the third decoupling electrode 29c are disposed to overlap the lower domain-dividing part 83 and/or the upper domain-dividing part 92, an aperture ratio of the LCD according to an exemplary embodiment is substantially improved, since areas occupied by the lower domain-dividing part 83 and/or the upper domain-dividing part 92 do not adversely affect the aperture ratio.

As described herein, a liquid crystal display according to exemplary embodiments of the present invention, coupling capacitances occurring between respective sub-pixel electrodes and data lines are substantially reduced and/or effectively minimized, while an aperture ratio of the liquid crystal display is effectively maximized. As a result a display quality of the liquid crystal display according to an exemplary embodiment is thereby improved.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the scope or spirit of the present invention as defined by the following claims.

What is claimed is:

1. A liquid crystal display comprising:
   a gate line and a decoupling line extending in a first direction;
   a first data line and a second data line extending in a second direction crossing the first direction;
   a pixel electrode comprising:
      a lower domain-dividing part formed thereon;
      a first sub-pixel electrode which receives a first data voltage from the first data line; and
      a second sub-pixel electrode which receives a second data voltage from the second data line;
   a common electrode disposed opposite the pixel electrode and comprising an upper domain-dividing part formed thereon; and
   a first decoupling electrode connected to the decoupling line and comprising:
      a slanting part which extends from the decoupling line; and
      a straight part connected to the slanting part and which extends from the slanting part;
   wherein
   the slanting part overlaps at least a portion of one of the lower domain-dividing part and the upper domain-dividing part, and
   the straight part is formed substantially parallel to the first data line in an area where the first sub-pixel electrode and the first data line are adjacent to each other.

2. The liquid crystal display of claim 1, wherein
   the lower domain-dividing part comprises a first lower domain-dividing part dividing the first sub-pixel electrode and the second sub-pixel electrode, and a second lower domain-dividing part disposed on the first sub-pixel electrode and the second sub-pixel electrode, and
   the slanting part overlaps at least a portion of the first lower domain-dividing part.

3. The liquid crystal display of claim 1, wherein
   the lower domain-dividing part comprises a first lower domain-dividing part dividing the first sub-pixel electrode and the second sub-pixel electrode, and a second lower domain-dividing part disposed on the first sub-pixel electrode, and the second sub-pixel electrode, and
   the slanting part overlaps at least a portion of the second lower domain-dividing part.

4. The liquid crystal display of claim 1, wherein a capacitance formed between the decoupling line and the pixel electrode is greater than approximately 5% of a capacitance formed between the pixel electrode and the common electrode and is less than approximately 20% of the capacitance formed between the pixel electrode and the common electrode.

5. The liquid crystal display of claim 4, wherein a width of the decoupling line measured in the second direction is greater than approximately 5 μm and is less than approximately 15 μm.

6. The liquid crystal display of claim 1, further comprising a second decoupling electrode extending from the decoupling line and being disposed substantially parallel to the second data line in an area where the first sub-pixel electrode and the second data line are adjacent to each other.

7. The liquid crystal display of claim 6, wherein a direct current voltage is applied to the decoupling line.

8. The liquid crystal display of claim 6, wherein at least a portion of the first data line and the second data line overlap at least a portion of the second sub-pixel electrode.

9. The liquid crystal display of claim 8, wherein the second sub-pixel electrode comprises:
   a main area formed at one of an angle of approximately 45° or approximately −45° with respect to the first direction; and
   a bridge area formed substantially parallel to the first data line the second data line, wherein
   the bridge area is connected to the main area, and
   the at least a portion of the first data line and the second data line overlaps at least a portion of the bridge area.

10. The liquid crystal display of claim 1, wherein the first data voltage is greater than the second voltage.

11. A liquid crystal display comprising:
    a gate line and a decoupling line extending in a first direction;
    a first data line and a second data line extending in a second direction crossing the first direction;
    a pixel electrode comprising:
       a first sub-pixel electrode which receives a first data voltage from the first data line; and
       a second sub-pixel electrode which receives a second data voltage from the second data line;
    a common electrode disposed opposite the pixel electrode;
    a first decoupling electrode extending from the decoupling line and being formed substantially parallel to the first data line in an area where the first sub-pixel electrode and the first data line are adjacent to each other; and
    a second decoupling electrode extending from the decoupling line and being formed substantially parallel to the second data line in an area where the first sub-pixel electrode and the second data line are adjacent to each other;
    wherein a capacitance formed between the decoupling line and the pixel electrode is greater than approximately 5% of a capacitance formed between the pixel electrode and the common electrode and is less than approximately 20% of the capacitance formed between the pixel electrode and the common electrode.

12. The liquid crystal display of claim 11, wherein a width of the decoupling line is greater than approximately 5 μm and less than approximately 15 μm.

13. The liquid crystal display of claim 11, wherein a direct current voltage is applied to the decoupling line.

14. The liquid crystal display of claim 11, wherein at least a portion of the first data line and the second data line overlaps at least a portion of the second sub-pixel electrode.

15. The liquid crystal display of claim 14, wherein the second sub-pixel electrode comprises:
  a main area formed at one of an angle of approximately 45° or approximately −45° with respect to the first direction; and
  a bridge area formed substantially parallel to the first data line and the second data line, wherein
  the bridge area is connected to the main area, and
  at least a portion of the first data line and the second data line overlap at least a portion of the bridge area.

16. The liquid crystal display of claim 11, wherein the first data voltage applied to the first sub-pixel electrode is less than the second data voltage applied to the second sub-pixel electrode.

* * * * *